United States Patent

[11] 3,554,329

[72] Inventor Keizo Shimano
 Sakai, Japan (c/o Shimano Industry Company No. 77, 3-cho Oimatu-cho)
[21] Appl. No. 007,388
[22] Filed Jan. 29, 1970
[45] Patented Jan. 12, 1971
[32] Priority Apr. 26, 1968
[33] Japan
[31] 43/34330, 43/34331 and 43/34332
 Continuation of application Ser. No. 734020, June 3, 1968, now abandoned.

[54] HAND BRAKE FOR A BICYCLE
 1 Claim, 7 Drawing Figs.
[52] U.S. Cl. ........................ 188/24, 188/83, 188/106
[51] Int. Cl. ........................ B62l 3/02
[50] Field of Search ........................ 188/24, 25, 26, 106, 83

[56] References Cited
UNITED STATES PATENTS

| | | | |
|---|---|---|---|
| 526,317 | 9/1894 | Hendrick et al. | 188/26 |

FOREIGN PATENTS

| | | | |
|---|---|---|---|
| 149,030 | 3/1937 | Austria | 188/26 |
| 25,175 | 9/1922 | France | 188/24 |
| 458,827 | 8/1913 | France | 188/24 |
| 854,374 | 1/1940 | France | 188/26 |

Primary Examiner—George E. A. Halvosa
Attorney—Moonray Kojima

ABSTRACT: A bicycle braking system in which a secondary apparatus is provided which is independent of the primary braking apparatus, for locking the brake in a braked position. The secondary apparatus may be either a means for operating on the linkage between the brake handle and the brake, or means operating directly on the brake.

PATENTED JAN 12 1971 3,554,329

INVENTOR
KEIZO SHIMANO

BY
ATT.

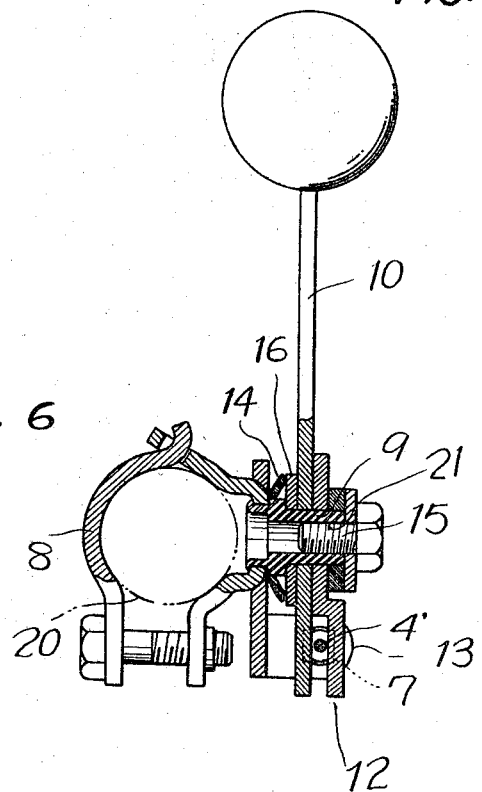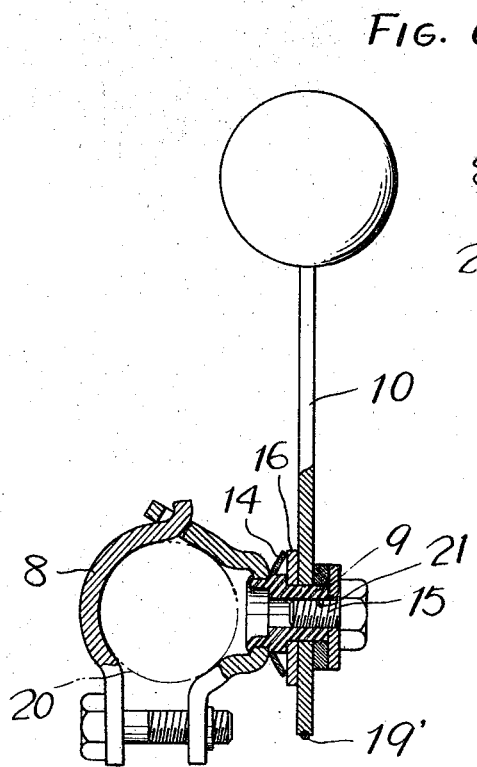

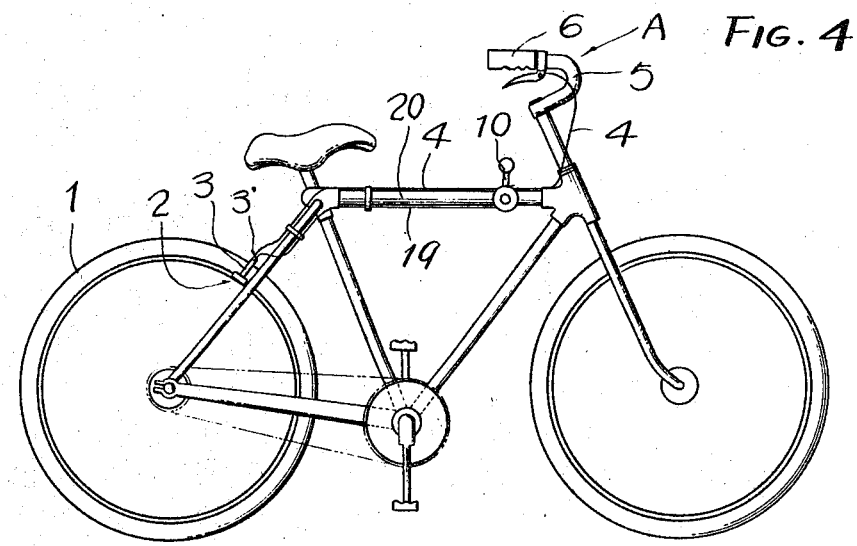
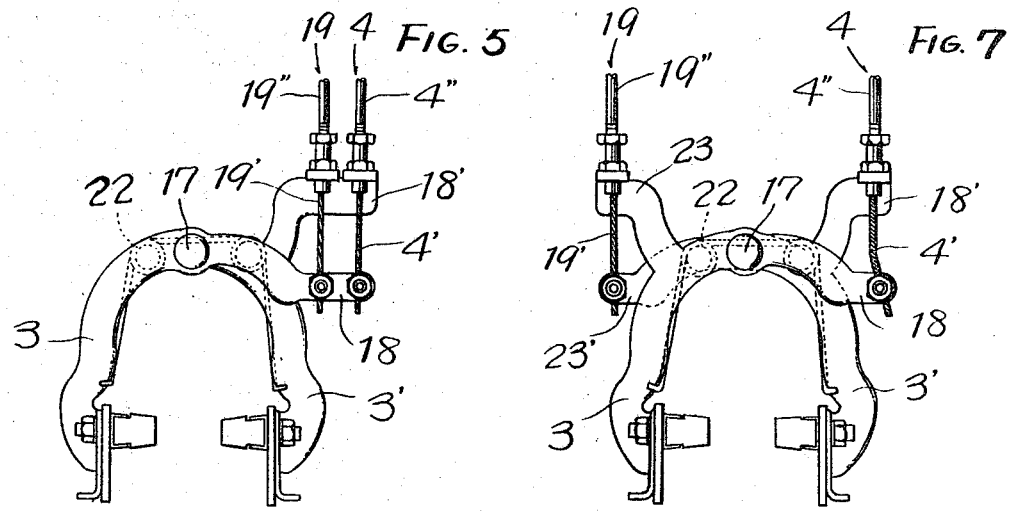

HAND BRAKE FOR A BICYCLE

This application is a continuation of application Ser. No. 734,020, filed June 3, 1968, and now abandoned.

This invention is related to a hand brake for a bicycle devised in such a manner that a cyclist can continue to manipulate it at his option whenever he wants to brake a cycle to a stop or ride down a long sloping road.

Referring to the conventional types of a brake for a bicycle, either a coaster brake or a caliper brake among many others has been in general use. According to these systems, a restorable spring is provided therein so that when a brake is taken off after applied, it immediately restores to release brakage. Meanwhile, as it is seen in recent years, most of bicycles are formed very sporty in appearance to such an extent that the supporting leg which used to be provided at both sides rearwardly of a bicycle is now simply provided at a single side only thereof, accompanying with the difficulty that the wheel is unexpectedly liable to turn round if a cyclist leaves his bicycle at a stop on a sloping road or a hill.

Furthermore when he cycles down a slope he must put on the aforementioned brake while keeping on wheeling with accelerated velocity. Then, once he ceases braking, the brakage is immediately released by means of the restorable spring as has been mentioned. Thus he has long to continue braking, with painstaking effort especially when wheeling down along a very long incline. This may on many occasions give rise to the jeopardies that he fails to manipulate a handle or cycles down at the increased speed confusedly without braking, at last to fall down violently or come into collision.

The present invention primarily aims at disrooting these deficiencies, having for one of its principal objectives a provision of such an ideal brake that makes it possible to keep a bicycle securely to a halt intermediately on an incline like a sloping road, and further having for it another object a provision of the brake that also enables a cyclist to continue controlling the speed of the bicycle at safe and equal rate.

Further object of the invention is to provide the brake that has not only the efficiency of the instantaneous halt of the wheeling of a bicycle but also the aforementioned noble efficiency and yet that can be economically constructed with far simplified structural elements by mere use of a single unit of the conventional brake widely applied to a bicycle.

As has been pointed out, the characteristics of this invention lies in that the above-mentioned two efficiencies can be secured by means of a single brake unit and its noble features are as fully comprehended in what is claimed in this specification of the invention.

Setting forth each FIG. of the accompanied drawings, FIGS. 1 through 3 are illustrative of an embodiment executed in conformity with the present invention and especially:

FIG. 3 is likewise a cross section showing a part thereof, and

FIGS. 4 through 6 are illustrative of another embodiment of the invention and especially, FIG. 4 shows an outline thereof, FIG. 5 is a front view showing the principal elements thereof, FIG. 6 is a cross section showing a part thereof, and FIG. 7 is a front view delineating a modified form of the embodiment shown in FIG. 5.

Figure 1:
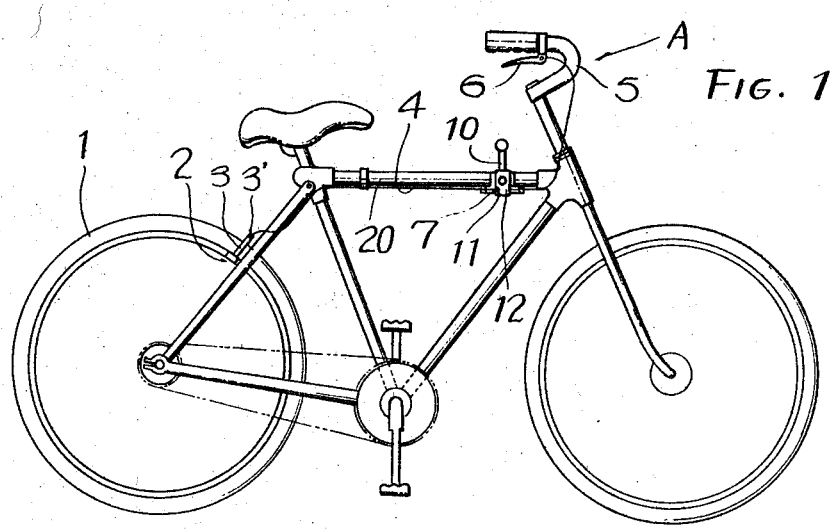
FIG. 1 shows an outline thereof.
Figure 2:
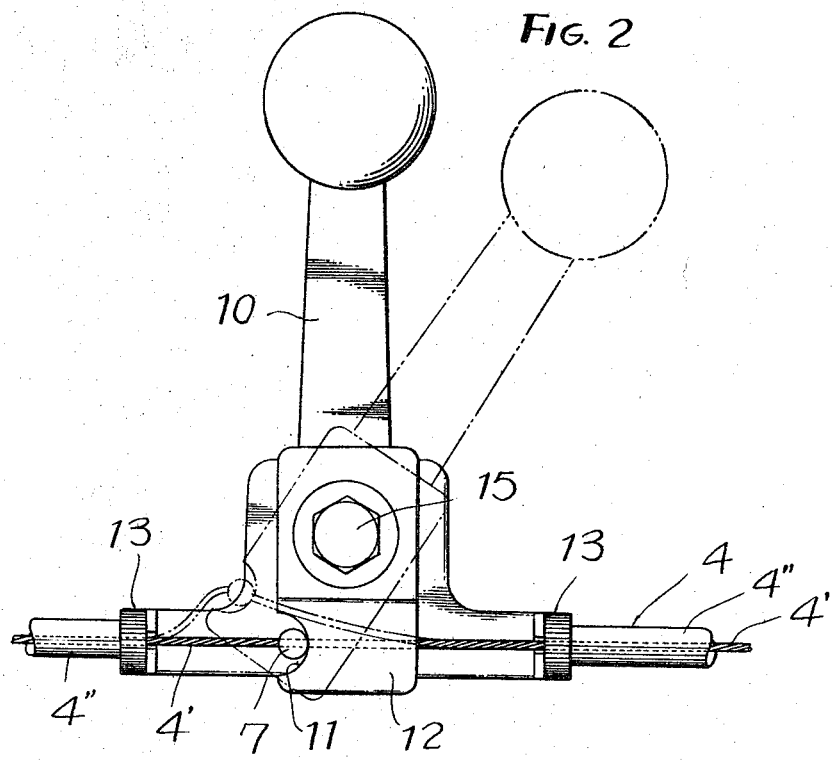
FIG. 2 is a front view showing the principal elements thereof.

Firstly referring to an embodiment of the present invention especially with regard to FIGS. 1 through 3, a bicycle A has a rear wheel 1 on which is provided a caliper brake 2 having a couple of relatively movable brake rods 3, 3'. Said brake rods 3, 3' respectively sustain each end of the inner wire 4' and the outer wire 4'', the other end of said wire 4 being supported on the brake through the movable element and fixing element of the handle lever 6 mounted on the handle 5 of the bicycle A. In the intermediate portion of said wire 4 is fixedly mounted a connector shaped peripherally in a circular arc, and close to the fixed place of said connector 7 is provided a fixing loop 8 from which an axis 9 laterally protrudes to movably mount a shift lever 10. In the edge of said shift lever 10 is provided a forked element 12 formed with an arc-shaped notch 11, the interval of each forked element 12 being made smaller than the length of said connector 7 so that the inner wire 4' is inset within this interval. When the shift lever 10 moves, said connector 7 is contacted with the notch 11 of the forked element 12 and push to move along the movement thereof. Incidentally, reference numeral 13 designates a sustainer of the outer wire 4'', fixed on a part of the fixing loop 8, and reference numeral 14 denotes a dish spring mounted intermediate the fixing loop 8 and the shift lever 10. At 15 is shown a male screw so provided to engage with a female screw 21 of the axis 9.

Thus said dish spring 14 is forced to mount against the fixing portion of the fixing loop 8 by screwing the male screw 15 into the female screw 21. It is noted therefore that the shift lever 10, when moved to a desired position and then released, will stay at a standstill at the point where it has been moved, thereby enabling a cyclist to further continue manipulating a brake. A washer 16 is provided to function as a stopper of extra movement of the shift lever 10.

Accordingly, the brake of conventional character can be performed that halts the wheeling of a bicycle on the spot when the handle lever 6 is clutched with hand, as it jerks the inner wire 4' to move the brake rods 3, 3'. In this connection, however, it is understood that the shift lever 10 is not moved because the connector 7 provided on the inner wire 4' is moved to the direction separating from the notch 11 in the forked element 12 of the shift lever 10. Thus brakage can be secured irrespective of the movement of the shift lever 10.

Meanwhile, when the shift lever 10 is moved, the forked element 12 is also moved along therewith. The notch 11 of this forked element 12 comes into contact with the connector 7 whereby the latter is forcibly transferred to jerk the inner wire 4' and as a result the brake rods 3, 3' are moved to operate the caliper brake 2. Though the portion of the wire 4 extending within the handle lever 6 is made slackened at this moment, yet it gives no impediment to the manipulation of the shift lever 10 partly because the latter is to be manipulated when a bicycle is at a halt, and partly because the slackened portion is to be strained back by dint of the restorable spring when the shift lever 10 is released.

In order to move the shift lever 10, the lever is loaded with a bigger power than the resisting force of said restorable spring and therefore it can stay at a standstill at the place where it has been moved, and refuses to move back to the place where it occupied even after released, thereby making it possible to maintain the brakage of the caliper brake 2 for successively many hours.

Now referring to FIGS. 4 through 6 in respect of another embodiment of the invention, the features definitely discriminating this from the preceding embodiment is that a couple of wire are supportedly connected to a single brake unit, and each piece of wire is to be manipulated respectively by each different shift lever. Namely, in this single brake unit, the wire 4 connected to the handle lever 6 is supported in connection with the sustainers 18, 18' fitted on the brake rods 3, 3' and on the end of said sustainers 18, 18', that is, the end different from each supporting portion of said wire 4, is supported each end of the inner wire 19' and the outer wire 19'' of the other wire 19 that said wire 4. The other end of the inner wire 19' is connected to a portion of the shift lever 10 movably mounted on the top tube 20 of a bicycle A by means of the fixing loop 8, and said outer wire 19'' is sustained on the sustainer mounted on the fixing element adjacent to the shift lever 10.

Accordingly, the brake of conventional character can be performed that halts a bicycle on the spot when the handle lever 6 is clutched with hand, as it jerks the inner wire 4' to move the brake rods 3, 3'. It is understood in this connection that another wire 19 is made slackened at this moment, but it does not work to move the shift lever 10 partly because said wire 19 is of flexible quality and partly because said shift lever 10 is loaded with a power of resistance against movement. On the other hand, if the shift lever 10 is moved, the wire 19 which is different from said wire 4 is to be jerked to operate the brake rods 3, 3', just as in the aforementioned manner, whereby brakage is to be performed. However, the movement of this shift lever 10 is loaded with a greater power than the resisting force of the resurable spring 22 of the brake rods 3, 3' and therefore the inner wire 19' pulled by means of the movement of the shift lever 10 cannot be pulled back even after the lever is released, and as a result complete brakage can be maintained. In the meanwhile, the wire 4 is likewise made slackened at this moment, but the handle lever 6 sustaining the other end of the wire 4 is not provided with a fixing element to work to stop the movement of the wire 4. Thus, even though this handle lever 6 is transferred along therewith, yet it is pulled back to its original position by action of the restorable spring 22 when the shift lever 10 is pulled back and consequently there remains a slack of the wire 4 which otherwise is an impediment to its movement.

Referring further to another embodiment of the invention with reference to FIG. 7 of the accompanied drawings, this is a modified form of the embodiment shown in FIGS. 4 through 6, wherein a couple of wire are supported in connection with a single brake unit and each wire is so provided as to be moved by means of each different shift lever, just as has been explained in respect of FIGS. 4 thru 6. The discriminating features of this embodiment is that each connecting portion of the wire is provided respectively in said sustainers 18, 18' and also another sustainers 23, 23' provided in the place different from that of said sustainers 18, 18'. That is to say, with the coupling axis 17 of the brake rods 3, 3' as a center, the sustainers 23, 23' protrude from the brake rods 3, 3' almost in symmetrized form with the sustainers 18, 18' and the wire 4 is connected to the sustainers 18, 18' and the wire 19 is to be sustainers 23, 23'.

According to the present invention, it is clearly noted that by means of a single brake unit it is quite possible to secure the efficiency of the instantaneous halt of the wheeling of a bicycle by utilizing the wire of the brake and at the same time it is also possible to maintain the brakage for many hours successively by utilizing both the brake rods and the sustainers thereof. From this it is concluded that a cyclist while wheeling on is able to not only brake his bicycle to a stop in a moment but also park it safely on an incline like a sloping road by completely braking even if it is supported by a single supporting leg, and that when wheeling down along a very long incline, he is also able to successively maintain a desired brakage by only one process of manipulation of a brake without further need of continuously grasping the brake lever of the handle which otherwise he has generally to do; consequently he is able to handle a bicycle with much ease and security.

The last but not the least is that no brake unit of any special type is applied for the purpose of securing the successive maintenance of a desired brakage in accordance with the present invention, but so improved used is merely made of the existing brake unit that it can be constructed in a very simple manner and at a very low cost.

It should be noted that all the embodiments disclosed in the specification and the accompanied drawings of this invention are not altogether restricted within themselves, but what have been defined therein are only illustrative of some purviews of the invention.

I claim:

1. In a brake system for a bicycle having a frame and at least one wheel rotatably mounted on said frame and comprising:
   1. handle bar means mounted on said frame;
   2. handle lever means pivotally mounted on said handle bar means;
   3. brake rods mounted to frictionally contact said wheel to stop rotation thereof;
   4. spring means to hold said brake rods normally free of contact from said wheel; and
   5. flexible cable means interconnecting said handle lever means and said brake rods whereby movement of said handle lever means causes movement of said brake rods to cause said brake rods to contact said wheel against pressure of said spring means; the combination comprising,
   A. holder means affixed to said frame, comprising
      1. a body held about said frame,
      2. shaft means projecting from said body,
      3. pressure plate positioned on said shaft means and against said body, and
      4. adjustable screw means located at the free end of said shaft means;
   B. main lever means independent of said handle means rotatably mounted toward one end thereof on said shaft means between said pressure plate and said adjustable screw means, means defining a passage at said one end for inserting said cable means, said screw means being suitable tightened so that said pressure plate will place a pressure against said main lever means sufficient to hold said main lever means in any position against pressure exerted on said cable means by said spring means and by movement of said wheel against said brake rods; and
   C. knob means attached to said cable means in the vicinity of said one end of said main lever means, said one end being shaped such that rotation of said main lever means will move said knob means rotatably about said shaft means together with said one end, whereby said cable means is caused to move said brake rods against pressure from said spring means and thereby to cause contact of said brake rods against said wheel, and whereby pressure from said pressure plate will hold said main lever means in the resulting position thereby to hold said brake rods in said contacted position and thus enable coasting and parking.